Patented Jan. 14, 1936

2,027,896

UNITED STATES PATENT OFFICE 2,027,896

PRODUCTION OF ALKYL SULPHATES OF HIGH MOLECULAR WEIGHT

Heinrich Bertsch, Chemnitz, Germany, assignor to the firm H. Th. Böhme, Aktiengesellschaft, Chemnitz, Germany No Drawing. Application November 3, 1930, Serial No. 493,243. In Germany November 4, 1929

13 Claims. (Cl. 260—99.12)

The sulphuric esters of fatty acids obtained by treating unsaturated fatty acids of higher molecular weight, for instance oleic acid or linoleic acid, with concentrated sulphuric acid, have good emulsifying and wetting properties, on account of which they are used as emulsifying, wetting, foaming, and impregnating agents and the like.

The principal object of the present invention is to provide a class of preparations of the same type, but with superior properties. According to the invention such preparations can be obtained by sulphating unsaturated aliphatic hydrocarbons under mild conditions. Especially from unsaturated hydrocarbons with one or several double linkages and containing from 10 to 18 carbon atoms in the chain sulphuric esters of the corresponding hydroxy compounds are obtained, which have high wetting, foaming, and emulsifying properties, and are also very stable towards concentrated acid, alkali, and salt solutions and the substances causing hardness of water.

The process is preferably performed by treating the unsaturated hydrocarbon at a temperature of between minus 10° and 0° and while stirring vigorously with one and a half or two parts of concentrated sulphuric acid. When treating the higher molecular olefines and/or working at very low temperatures it is preferable to add a thinning medium and solvent, for instance trichlorethylene, benzene or butyl alcohol, whereby uniform action of the sulphuric acid on the whole reaction mass is ensured.

Example 1

100 kg. of cetene (hexadecylene), which may be obtained for instance by the distillation of spermaceti at reduced pressure, are mixed with 25 kg. of butyl alcohol and cooled to minus 5° C. The mixture is sulphated slowly and while stirring with 150 kg. of concentrated sulphuric acid, the temperature of minus 5° being maintained during the reaction. The following reaction occurs:

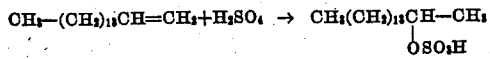

When the whole quantity of the sulphuric acid is introduced, the reaction product is freed from excessive sulphuric acid by washing with saturated Glauber's salt solution. The acid washing liquor is separated and the product is then neutralized by sodium or other alkali hydroxide solution. The resulting oily preparation forms a clear solution with water. It can be obtained free from water by evaporation.

Example 2

100 kg. of decylene, which can be obtained for instance by dry heating of a mixture of sodium ethylate with undecylene acid (which can easily be obtained from castor oil) are mixed with 50 kg. of benzene and the mixture is cooled down to a temperature of minus 10° C. 100 kg. of concentrated sulphuric acid are added slowly and while stirring the temperature of minus 10° C. being maintained. When the whole quantity of the sulphuric acid is introduced, the excessive sulphuric acid is removed by washing with saturated Glauber's salt solution. The acid washing liquor is separated and the product is neutralized by sodium hydroxide solution. The resulting oily product forms a clear solution with water.

Instead of the initial products mentioned in the examples it is also possible to use mixtures of unsaturated hydrocarbons of suitable molecular weight, which can be obtained by the distillation of cracked mineral oils or tar oils.

The products obtained by sulphating of olefines, which show the constitution of sulphuric esters of hydroxy compounds corresponding to the olefines used, have very good wetting, emulsifying, and foaming properties and especially the property of imparting a soft, smooth, but not sticky, feel to textile fibers and similar materials. They are therefore suitable to be added to treatment liquids of all kinds for use in the textile and leather industries and are also qualified for the use in other technical domains for the purpose of wetting, foaming, dispersing of reagents or of impurities of the treated materials, cleaning, smoothing, and softening. The products are very pure and but slightly colored. They are therefore suitable also for the treatment of materials sensitive to coloring and for the dyeing of light shades.

I claim:

1. The production of wetting, dispersing, foaming, and smoothing agents for use in the textile, leather, and other industries consisting in the conversion of unsaturated aliphatic hydrocarbons with not less than 10 carbon atoms into sulphuric esters of the corresponding hydroxy compounds by treating said unsaturated hydrocarbons with mildly acting sulphating means at a temperature not exceeding 0° C.

2. The production of wetting, dispersing, foaming, and smoothing agents for use in the textile, leather, and other industries, consisting in the conversion of unsaturated aliphatic hydrocarbons with not less than 10 carbon atoms into sulphuric esters of the corresponding hydroxy compounds by treating said unsaturated hydrocarbons with mildly acting sulphating means at a temperature not exceeding 0° C. and neutralizing the product by addition of alkali hydroxide.

3. The production of agents of the kind set forth consisting in the conversion of unsaturated aliphatic hydrocarbons with 10–18 carbon atoms into sulphuric esters of the corresponding hydroxy compounds by treating said unsaturated hydrocarbons with concentrated sulphuric acid at temperatures below 0° C. in the presence of a solvent and thinning medium.

4. The production of agents of the kind set forth consisting in the conversion of unsaturated aliphatic hydrocarbons with 10–18 carbon atoms into sulphuric esters of the corresponding hydroxy compounds by treating said unsaturated hydrocarbons with concentrated sulphuric acid at temperatures below 0° C. in the presence of a solvent and thinning medium and neutralizing the product by addition of alkali hydroxide.

5. The production of the sodium compound of the sulphuric ester of cetyl alcohol for use as an agent of the kind set forth, consisting in treating cetene with concentrated sulphuric acid at a temperature between minus 10° and 0° in the presence of butyl alcohol and washing and neutralizing the product.

6. A wetting, dispersing, foaming, and smoothing composition for use in the textile, leather and other industries, comprising essentially a sulphuric ester derived from an unsaturated aliphatic hydrocarbon containing not less than 10 carbon atoms, by the action of a mildly acting sulphating medium at a temperature not exceeding 0° C.

7. A wetting, dispersing, foaming, and smoothing composition for use in the textile, leather and other industries comprising essentially an alkali metal compound of a sulphuric ester derived from an unsaturated aliphatic hydrocarbon containing not less than 10 carbon atoms, by the action of a mildly acting sulphating medium at a temperature not exceeding 0° C.

8. As a new compound, the sulphate ester of an aliphatic hydrocarbon having not less than 10 carbon atoms, the sulphate radical being joined at a secondary carbon atom.

9. As a new compound, the alkali metal salt of a sulphate ester of an aliphatic hydrocarbon having not less than 10 carbon atoms, the sulphate radical being joined at a secondary carbon atom.

10. As a new compound, the sulphate ester of cetene, the sulphate radical being joined at a secondary carbon atom.

11. As a new compound, the sulphate ester of decane, the sulphate radical being joined at a secondary carbon atom.

12. As a new compound, the sodium salt of the sulphate ester of cetene, the sulphate radical being joined at a secondary carbon atom.

13. As a new compound, the sodium salt of the sulphate ester of decane, the sulphate radical being joined at a secondary carbon atom.

HEINRICH BERTSCH.

CERTIFICATE OF CORRECTION.

Patent No. 2,027,896.                                                  January 14, 1936.

HEINRICH BERTSCH.

It is hereby certified that the above numbered patent was erroneously issued to "the firm H. Th. Bohme, Aktiengesellschaft, of Chemnitz, Germany", as assignee of the entire interest in said invention, whereas said patent should have been issued to American Hyalsol Corporation, of Wilmington, Delaware, a corporation of Delaware, as assignee by mesne assignments of the entire interest in said invention; page 2, second column, lines 23 and 29, claims 10 and 12 respectively, for "cetene" read cetane; and that the said Letters Patent should be read with these corrections therein that the same may conform to the record of the case in the Patent Office.

Signed and sealed this 3rd day of March, A. D. 1936.

(Seal)                                                       Leslie Frazer
                                                           Acting Commissioner of Patents.